US008548895B2

(12) United States Patent
Walker et al.

(10) Patent No.: US 8,548,895 B2
(45) Date of Patent: Oct. 1, 2013

(54) METHOD, SYSTEM AND COMPUTER PROGRAM PRODUCT FOR FACILITATING AN AUCTION BEHAVIOR AND AUTOMATIC BIDDING IN AN AUCTION

(75) Inventors: Jay S. Walker, Ridgefield, CT (US); Daniel E. Tedesco, Huntington, CT (US); Kathleen M. Van Luchene, Santa Fe, NM (US); James A. Jorasch, New York, NY (US); Adam Ware, Scarsdale, NY (US)

(73) Assignee: Walker Digital, LLC, Stamford, CT (US)

( * ) Notice: Subject to any disclaimer, the term of this patent is extended or adjusted under 35 U.S.C. 154(b) by 71 days.

(21) Appl. No.: 13/022,189

(22) Filed: Feb. 7, 2011

(65) Prior Publication Data

US 2011/0131111 A1    Jun. 2, 2011

Related U.S. Application Data

(60) Continuation of application No. 11/423,821, filed on Jun. 13, 2006, now Pat. No. 7,899,737, which is a division of application No. 09/523,653, filed on Mar. 10, 2000, now abandoned.

(60) Provisional application No. 60/152,119, filed on Sep. 2, 1999.

(51) Int. Cl.
*G06Q 40/00* (2012.01)

(52) U.S. Cl.
USPC .............................. 705/37; 705/35; 705/36 R

(58) Field of Classification Search
USPC ............... 709/203; 705/26, 26.1, 27, 27.1, 705/35, 36, 36 R, 37, 36.1
See application file for complete search history.

(56) References Cited

U.S. PATENT DOCUMENTS 4,789,928 A    12/1988  Fujisaki
4,799,156 A     1/1989  Shavit et al.
(Continued)

FOREIGN PATENT DOCUMENTS

WO    WO 98/43146    *   3/1998
WO    WO 9843146     *  10/1998

OTHER PUBLICATIONS

Trout, Robert R.; "A Market-based Method for Relicensing Federal Hydroelectric Sites"; Public Utilities Fortnightly; Jan. 19, 1984, vol. 113, Issue 2; pp. 1 and 2.*

(Continued)

*Primary Examiner* — Ella Colbert
(74) *Attorney, Agent, or Firm* — Fincham Downs, LLC; Carson C. K. Fincham

(57) ABSTRACT

One or more proxy bidders is associated with a rule which determines a time to place a bid. The proxy bidder places a bid at the determined time, instead of immediately after the bidder's prior bid is exceeded. Such rules may be selected for all proxy bidders to encourage a desired auction behavior. By controlling the placement of bids based on rules associated with the desired auction behavior, bids may be placed in a manner that seems natural and competitive to bidders in the auction when, in fact, they are placed in accordance with the selected rules. The desired auction behavior may be selected statically for an auction or dynamically during the auction. Historical auction data maybe analyzed to characterize the behavior of an auction, such as the average period of time between bids and the average increment between bids. Rules may be generated to correspond to a behavior so as to provide the same average time and increment between bids.

9 Claims, 16 Drawing Sheets

(56) References Cited

U.S. PATENT DOCUMENTS

| | | | |
|---|---|---|---|
| 4,881,178 A * | 11/1989 | Holland et al. | 706/12 |
| 5,253,165 A | 10/1993 | Liseca et al. | |
| 5,270,921 A | 12/1993 | Hornick | |
| 5,634,055 A | 5/1997 | Barnewall et al. | |
| 5,758,328 A | 5/1998 | Giovannoli | |
| 5,794,207 A | 8/1998 | Walker et al. | |
| 5,826,244 A | 10/1998 | Huberman | |
| 5,835,896 A * | 11/1998 | Fisher et al. | 705/37 |
| 5,839,114 A | 11/1998 | Lynch et al. | |
| 5,873,071 A | 2/1999 | Ferstenberg et al. | |
| 5,890,138 A | 3/1999 | Godin et al. | |
| 5,897,620 A | 4/1999 | Walker et al. | |
| 5,905,975 A | 5/1999 | Ausubel | |
| 6,012,045 A | 1/2000 | Barzilai et al. | |
| 6,044,363 A * | 3/2000 | Mori et al. | 705/37 |
| 6,230,146 B1 | 5/2001 | Alaia et al. | |
| 6,243,691 B1 * | 6/2001 | Fisher et al. | 705/37 |
| 6,285,987 B1 * | 9/2001 | Roth et al. | 705/14.71 |
| 6,285,989 B1 * | 9/2001 | Shoham | 705/37 |
| 6,449,601 B1 * | 9/2002 | Friedland et al. | 705/37 |
| 6,499,018 B1 | 12/2002 | Alaia et al. | |
| 7,085,740 B1 * | 8/2006 | Meyers | 705/37 |
| 7,177,832 B1 * | 2/2007 | Semret et al. | 705/37 |
| 7,219,080 B1 * | 5/2007 | Wagoner et al. | 705/37 |
| 7,330,826 B1 * | 2/2008 | Porat et al. | 705/26.3 |
| 2001/0027431 A1 | 10/2001 | Rupp et al. | |
| 2008/0162331 A1 | 7/2008 | Ephrati et al. | |

OTHER PUBLICATIONS

Timothy Gassen; "Robby the Robot would marvel at how he is sold"; Arizona Daily Star; Feb. 1999; pp. 1 and 2.*

Charles W. Richter, Jr. and Gerald B. Sheble; "Genetic Algorithm Evolution of Utility Bidding Strategies for the Competitive Marketplace"; IEEE Transactions On Power Systems, vol. 13, No. 1; Feb. 1998; pp. 256-261.*

Eduard Gimenez-Tunes, Lluis Godo, Juan A. Rodriguez-Aguilar, and Pere Garcia-Calves; "Designing Bidding Strategies for Trading Agents in Electronic Auctions"; IEEE; 1998; pp. 136-143.*

W. Mielczarski, G. Michalik, and M. Widjaja; "Bidding Strategies in Electricity Markets"; IEEE; 1999; pp. 71-76.*

Abstract: Mielczarski, W., Michalik, G., and Widjaja, M.; "Bidding strategies in electricity markets"; IEEE; Jul. 1999; pp. 1 and 2.*

Maney, K.; "eBay erupts Net Auctioneer's volcanic success looks unstopple"; USA Today; Feb. 5, 1999; p. 1.*

Michael N. Huhns and Jose' M. Vidal; "Online Auctions"; IEEE Internet Computing; May-Jun. 1999; pp. 103-105.*

Douglas J. Lober and Michael Bailey; "Organizational Strategy, Managerial Decision-Making, and Market-Based Environmental Policies: Utility Company Bidding behavior in the Sulfur Dioxide Allowance Trading Auctions"; Managerial and Decision Economics, vol. 18, No. 6; Sep. 1997; pp. 471-489.*

Yasushi Hamao and Narasimhan Jegadeesh; "An Analysis of Bidding in the Japanese Government Bons Auctions"; The Journal of Fianance, vol. 53, No. 2; Apr. 1998; pp. 755-772.*

Canadian Corporate News; "Ritchie Bros. Auctioneers to Broadcast Auction on the Internet for the First Time!"; Feb. 16, 1999; pp. 1-2.*

Janine Aron; "Policy Rules and Bidding Behaviour in the Ethiopian Foreign Exchange Auction"; WPS/98-11: Apr. 1998; pp. 1-31.*

Trout, Robert R.; "A Market-based Method for Relicensing Federal Hydroelectric Sites"; Public Utilities Fortnightly; Jan. 19, 1984; vol. 113, Issue 2; 2 pp.

Office Action for U.S. Appl. No. 09/523,653 mailed May 12, 2004, 6 pp.

Office Action for U.S. Appl. No. 09/523,653 mailed Sep. 8, 2004, 10 pp.

Office Action for U.S. Appl. No. 09/523,653 mailed May 20, 2005, 14 pp.

Office Action for U.S. Appl. No. 09/523,653 mailed Feb. 13, 2006, 16 pp.

Office Action for U.S. Appl. No. 09/523,653 mailed Nov. 3, 2006, 19 pp.

Office Action for U.S. Appl. No. 09/523,653 mailed Sep. 10, 2007, 19 pp.

Office Action for U.S. Appl. No. 11/423,834 mailed Apr. 4, 2008, 7 pp.

Office Action for U.S. Appl. No. 11/423,834 mailed Nov. 5, 2008, 11 pp.

Office Action for U.S. Appl. No. 11/423,834 mailed Jul. 7, 2009, 13 pp.

Office Action for U.S. Appl. No. 11/423,827 mailed Jul. 25, 2007, 5 pp.

Office Action for U.S. Appl. No. 11/423,827 mailed Sep. 10, 2007, 8 pp.

Office Action for U.S. Appl. No. 11/423,827 mailed Jan. 24, 2008, 7 pp.

Office Action for U.S. Appl. No. 11/423,827 mailed May 14, 2008, 11 pp.

Office Action for U.S. Appl. No. 11/423,827 mailed May 28, 2009, 8 pp.

Notice of Allowance and Interview Summary for U.S. Appl. No. 11/423,827 mailed Jan. 6, 2010, 13 pp.

Notice of Allowance for U.S. Appl. No. 11/423,827 mailed May 14, 2010, 13 pp.

Notice of Allowance for U.S. Appl. No. 11/423,821 mailed Oct. 15, 2010, 4 pp.

Notice of Allowance for U.S. Appl. No. 11/423,821 mailed Jun. 10, 2010, 4 pp.

Office Action for U.S. Appl. No. 11/423,821 mailed Jan. 7, 2010, 16 pp.

Office Action for U.S. Appl. No. 11/423,821 mailed Jun. 2, 2009, 13 pp.

Office Action for U.S. Appl. No. 11/423,821 mailed Aug. 26, 2008, 16 pp.

Office Action for U.S. Appl. No. 11/423,821 mailed Sep. 10, 2007, 12 pp.

Bid Maker, The Covenient way to win, www.onsale.com/tools/bidmaker.htm, Down load Date: Jun. 8, 1999, 9 pp.

American Airlines Internet Silent Auction: Rules for American airlines Silent Auction, www.webmaster@americanair.com, Jun. 30, 1996, 12 pp.

Ebay: Proxy Bidding, www.pages.ebay.om/aw/help/help-t-bid-prxy.hmtl, Download Date: Jun. 9, 1999, 4 pp.

Auction Works: About CompuBid, www.auctionworks.com/compubid.html, Download Date: Jun. 4, 1999, 2 pp.

Travel Facts Auction: Frequently asked Questions, www.bid4travel.com/faq.htm#.compubid, Download date Jun. 4, 1999, 8 pp.

Emaze Auction, www.emaze.com/auction.cfm, Download Date: Jun. 19, 1999, 5 pp.

OpenSite Auction software: Corporate 40, www.opensite.com/products/software/corporate.html, Download Date: Jun. 19, 1999, 2 pp.

"The Growth of Pricing: Key Profit Center", Professional Pricing Society, 10th anniversary spring Pricing Conference, Orlando, FL, www.pricing-advisor.com/conf_agn.html, Download Date Jun. 19, 1999, 10 pp.

BoxLot Online Action: Review Auction & Bidding Formats, www.boxlot.com/formats.html, Download Date: Sep. 22, 1999, 5 pp.

Oberndorf, "Information Highway Robbery; Brief Article", Catalog Age, Dec. 1, 1998, No. 13, vol. 15; p. 59, 2 pp.

Interactive Public Relations & Marketing News: News Briefs, Jun. 26, 1998, vol. 5, No. 13, 2 pp.

"Emaze Software Releases Cold Fusion-Based Auction Program", PR Newswire, Aug. 18, 1998, 2 pp.

DiDio, "Airmax Management Package Keeps Vacant Seats to Minimim", Computerworld-Corporate Strategies, p. 29, 2 pp.

Feldman, "Reclaiming Control; New Software to Close Gap Between Projected and Actual Revenues", Air Transport World, Aug. 1995, vol. 32; No. 8; p. 35, 5 pp.

Feldman, "Pricing and Cybersales; Internet Airline Ticket Sales and Reservations", Air Transport World, Feb. 1998, No. 2; vol. 35; p. 64, 4 pp.

Solomon Brothers' Maldutis says Internet is Aviations's "Third Revolution," Will Earn Billions, World Airline News, Mar. 21, 1997, vol. 7, No. 12, 2 pp.

Adyanthaya, "Revenue Management, The Black Art", Interavia Business & Technology, Sep. 1998, No. 623; vol. 53; p. 43, 4 pp.

Ubid Online Auction: Ubid Help Pages, www.ubid.com/help/auctions_bidbutler.asp, Download Date: Jun. 8, 1999, 2 pp.

Amazon.com Auction Help: Bidder's Guide, www.auctions.amazon.com/exec/varzea/ts/help/bidding-by-proxy/002-0187463-5892847, Download Date: Jun. 8, 1999, 3 pp.

*Walker Digital, LLC's* v. *Google Inc., et al.*, Complaint, U.S. District Court, Delaware, dated Apr. 11, 2011, 37 pp.

*Walker Digital, LLC* v. *Google Inc., et al.*, Walker Digital, LLC's Opening Accelerated Markman Brief Regarding the Claim Term "Auction", US District Court, Delaware, dated Aug. 24, 2012, 11 pp.

*Walker Digital, LLC* v. *Google Inc., et al.*, Declaration of Benjamin T. Wang in Support of Walker Digital, LLC's Opening Accelerated Markman Brief Regarding the Claim Term "Auction", District Court, Delaware dated Aug. 24, 2012, 117 pp.

*Walker Digital, LLC* v. *Google Inc., et al.*, Defendant Responsive Limited Early Claim Construction Brief Regarding The Claim Term "Auction", District Court, Delaware dated Aug. 24, 2012, 16 pp.

Chavez, Anthony, "A Real-Life Experiment in Creating an Agent Marketplace," MIT Media Laboratory, 1997, 20 pp.

Rust, John, SIX Behavior of Trading Automata in a Computerized Double Auction Market, SFI Studies in the Sciences of Complexity, 1992, 44 pp.

Cardoso, Henrique, A Multi-Agent System for Electronic Commerce Including Adaptive Strategic Behaviours, 1999, 15 pp.

*Walker Digital, LLC* v. *Google Inc., et al.*, Walker Digital, LLC's Reply Markman Brief Regarding the Claim Tenn "Auction", US District Court, Delaware, dated Oct. 4, 2012, 16 pp.

*Walker Digital, LLC* v. *Google Inc., et al.*, 11-311-RGA, Claim Construction Order, US District Court, Delaware, filed May 22, 2013, 6 pp.

* cited by examiner

| ITEM IDENTIFIER 504 | ITEM DESCRIPTION 506 | ITEM CATEGORY 508 | SELLING PRICE 510 | BEHAVIOR IDENTIFIER 512 |
|---|---|---|---|---|
| I-1234 | PLATINUM & PEARL DINNER RING CIRCA 1920 | JEWELRY | N/A | B-B9765 |
| I-2345 | GLASS ROOSTER - PRE CIVIL WAR, 18" GREEN, YELLOW AND RED | ANIMAL FIGURINES | $70.00 | B-B8080 |
| I-3456 | ROLLER SKATES, 1928 - GOOD CONDITION, AUTHENTICATED. | ANTIQUE SPORTING EQUIPMENT | N/A | B-B7777 |
| I-4567 | TURN OF THE CENTURY PIE HUTCH - BEEN IN ONE FAMILY FOR 100 YEARS!! MUST SELL | ANTIQUE FURNISHINGS | $140.00 | B-B9862 |
| I-5678 | KARAOKE MACHINE PLUS TAPES, SHEET MUSIC - 80'S ROCK, EASY LISTENING FAVORITES | MUSICAL DEVICES | N/A | B-B2222 |

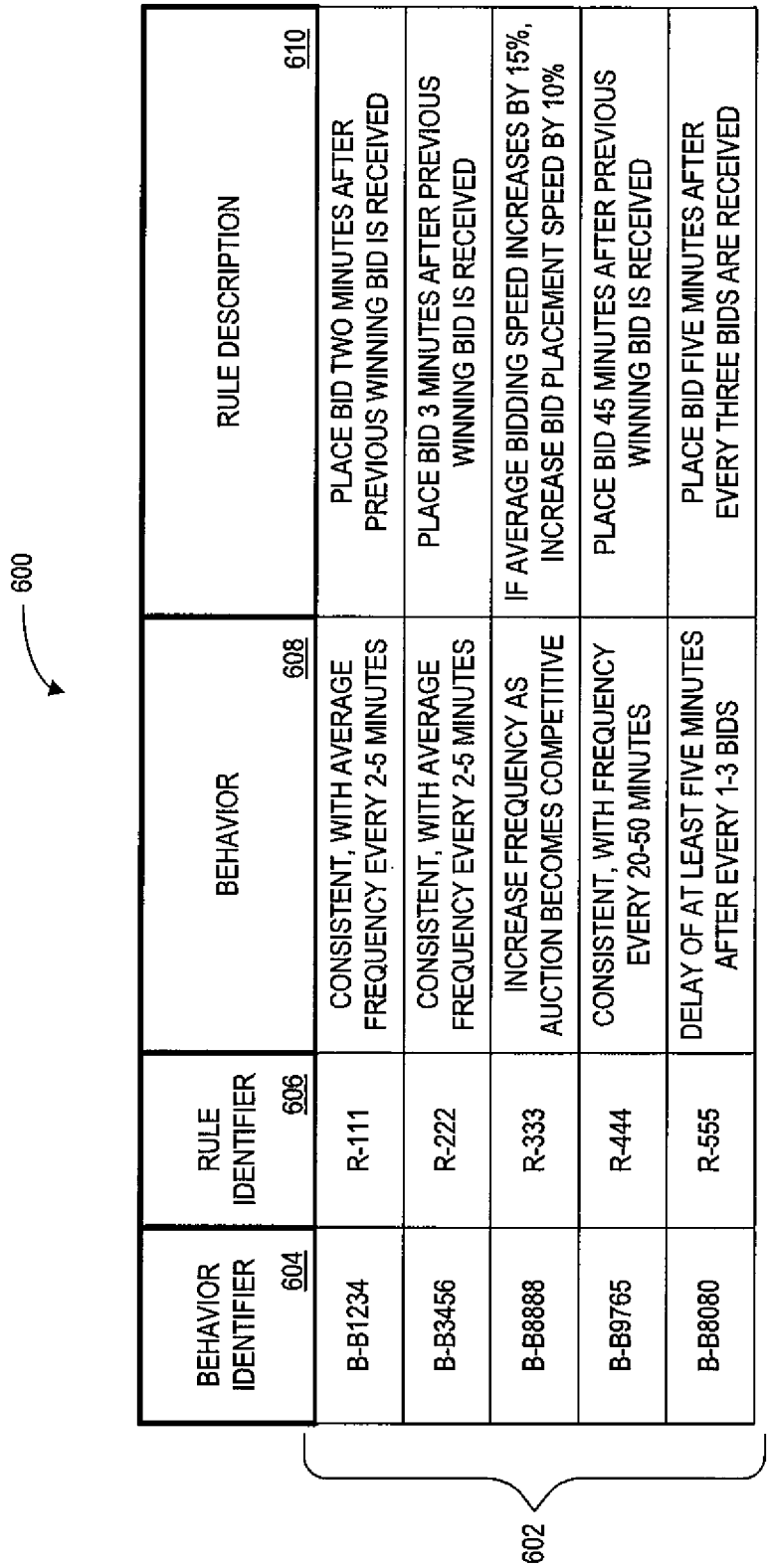

FIG. 6

| BEHAVIOR IDENTIFIER 604 | RULE IDENTIFIER 606 | BEHAVIOR 608 | RULE DESCRIPTION 610 |
|---|---|---|---|
| B-B1234 | R-111 | CONSISTENT, WITH AVERAGE FREQUENCY EVERY 2-5 MINUTES | PLACE BID TWO MINUTES AFTER PREVIOUS WINNING BID IS RECEIVED |
| B-B3456 | R-222 | CONSISTENT, WITH AVERAGE FREQUENCY EVERY 2-5 MINUTES | PLACE BID 3 MINUTES AFTER PREVIOUS WINNING BID IS RECEIVED |
| B-B8888 | R-333 | INCREASE FREQUENCY AS AUCTION BECOMES COMPETITIVE | IF AVERAGE BIDDING SPEED INCREASES BY 15%, INCREASE BID PLACEMENT SPEED BY 10% |
| B-B9765 | R-444 | CONSISTENT, WITH FREQUENCY EVERY 20-50 MINUTES | PLACE BID 45 MINUTES AFTER PREVIOUS WINNING BID IS RECEIVED |
| B-B8080 | R-555 | DELAY OF AT LEAST FIVE MINUTES AFTER EVERY 1-3 BIDS | PLACE BID FIVE MINUTES AFTER EVERY THREE BIDS ARE RECEIVED |

| BIDDER IDENTIFIER 704 | ITEM IDENTIFIER 706 | RULE IDENTIFIER 708 | BID CEILING 710 |
|---|---|---|---|
| 58675 | I-1234 | R-444 | $70.00 |
| 58675 | I-3339 | R-777 | $48.00 |
| 98245 | I-4848 | R-999 | $54.00 |
| 48652 | I-5678 | R-898 | $150.00 |

FIG. 7

| ITEM IDENTIFIER: | I-1234 |
|---|---|
| | 802 |

| AUCTION START DATE/TIME: | 10/21/99 8:00 A.M. |
|---|---|
| | 804 |

| AUCTION END DATE/TIME: | 10/23/99 8:00 A.M. |
|---|---|
| | 806 |

| CURRENT NUMBER OF PARTICIPATING BIDDERS: | 5 |
|---|---|
| | 808 |

| BID INCREMENT AMOUNT: | $2.00 |
|---|---|
| | 810 |

| BIDDER IDENTIFIER 816 | BID AMOUNT 818 | BIDDING TIME 820 | TYPE OF BIDDER 822 |
|---|---|---|---|
| 00009 | $4.00 | 8:15 A.M. | MANUAL |
| 58675 | $6.00 | 9:00 A.M. | PROXY |
| 23232 | $8.00 | 10:00 A.M. | PROXY |
| 99989 | $20.00 | 10:05 A.M. | MANUAL |
| 58675 | $22.00 | 10:50 A.M. | PROXY |

FIG. 8

METHOD, SYSTEM AND COMPUTER PROGRAM PRODUCT FOR FACILITATING AN AUCTION BEHAVIOR AND AUTOMATIC BIDDING IN AN AUCTION

CROSS-REFERENCE TO RELATED APPLICATIONS

The present application is a continuation of U.S. patent application Ser. No. 11/423,821, filed Jun. 13, 2006, entitled "METHOD, SYSTEM AND COMPUTER PROGRAM PRODUCT FOR FACILITATING AN AUCTION BEHAVIOR AND AUTOMATIC BIDDING IN AN AUCTION" which issued as U.S. Pat. No. 7,899,737 on Feb. 1, 2011, which itself claims priority to and is a divisional patent application of U.S. patent application Ser. No. 09/523,653, filed Mar. 10, 2000, entitled "METHOD, SYSTEM AND COMPUTER PROGRAM PRODUCT FOR FACILITATING AN AUCTION BEHAVIOR AND AUTOMATIC BIDDING IN AN AUCTION", which is now abandoned, and which claims the benefit of U.S. patent application Ser. No. 60/152,119 filed Sep. 2, 1999. Each of the above-referenced applications is hereby incorporated herein by reference.

The present application is also related to: (i) U.S. patent application Ser. No. 11/423,834, filed Jun. 13, 2006, entitled "METHOD, SYSTEM AND COMPUTER PROGRAM PRODUCT FOR FACILITATING AN AUCTION BEHAVIOR AND AUTOMATIC BIDDING IN AN AUCTION", now abandoned, which is a continuation of U.S. patent application Ser. No. 09/523,653, filed Mar. 10, 2000, entitled "METHOD, SYSTEM AND COMPUTER PROGRAM PRODUCT FOR FACILITATING AN AUCTION BEHAVIOR AND AUTOMATIC BIDDING IN AN AUCTION", which is now abandoned; and (ii) divisional patent application Ser. No. 11/423,827, filed Jun. 13, 2006, entitled "METHOD, SYSTEM AND COMPUTER PROGRAM PRODUCT FOR FACILITATING AN AUCTION BEHAVIOR AND AUTOMATIC BIDDING IN AN AUCTION", issued as U.S. Pat. No. 7,801,802, which itself is a divisional patent application of U.S. patent application Ser. No. 09/523,653, filed Mar. 10, 2000, entitled "METHOD, SYSTEM AND COMPUTER PROGRAM PRODUCT FOR FACILITATING AN AUCTION BEHAVIOR AND AUTOMATIC BIDDING IN AN AUCTION", which is now abandoned. Each of the above-referenced applications is incorporated by reference herein in its entirety.

BACKGROUND

Auctions for items may be held in many different ways. Bidders may be physically present at one location or may be dispersed geographically. Bids may be submitted during a specified time in advance of the auction. Bidders may submit spoken bids, written bids or electronic bids, for example over a computer or other communications network. Using such a network, an auction may be performed entirely online. In an online auction, a bidder may place bids manually or may use a proxy bidder, which places bids automatically on behalf of the bidder. An example of an online auction with a proxy bidder is described in U.S. Pat. No. 5,835,896 to Fisher et al.

Using a conventional proxy bidder, a bidder in an online auction specifies how bids should be placed. Typically, a proxy bidder determines a bid amount and places a bid for the bidder instantly after the proxy bidder detects that the previous bid is surpassed. For example, a proxy bidder may use a maximum desired amount for the item and an increment to add to a previously placed bid. The proxy bidder places bids in the smallest increment needed to exceed the previous bid, until reaching the maximum amount specified by the bidder. In summary, if an auction is performed with proxy bidders, bidding occurs unnaturally, quickly and early.

SUMMARY

The outcome of an auction, such as price and/or speed at which the item is sold, depends in part on the way that bidders bid for the item. In particular, the behavior of one or more bidders in an auction may influence another bidder's perception of the value of the item. For example, if one or more bidders place bids aggressively (e.g., bids are placed frequently, subsequent bid prices increase significantly), perhaps due to the use of proxy bidders, another bidder's perceived value of the item may be increased. However, proxy bidders may discourage bidders from participating in online auctions by making the bids appear automated and out of human control. Users also may become frustrated from, for example, being outbid instantly and may become discouraged from participation in the auction.

One or more proxy bidders is associated with at least one rule which determines a time to place a bid. The proxy bidder places a bid in accordance with the at least one rule at the determined time, which may be different from the time immediately after the bidder's prior bid is exceeded by another's bid. Such rules may be selected for all proxy bidders in an auction to encourage a desired auction behavior. By controlling the placement of bids using rules associated with the desired auction behavior, bids may be placed in a manner that seems natural and competitive to bidders in the auction even though they are placed in accordance with selected rules. The desired auction behavior may be selected statically for an auction or dynamically before and/or during the auction. In one embodiment, historical auction data, such as the average period of time between bids and the average increment between bids, may be analyzed to characterize the behavior of an auction. Rules may be generated to correspond to a behavior so as to provide the same average time and increment between bids.

BACKGROUND

FIG. 5 is a diagram of an example table for a database of items;

FIG. 6 is a diagram of an example table for a database of behaviors and associated rules;

FIG. 7 is a diagram of an example table for a database of specifications for proxy bidders;

FIG. 8 is a diagram of an example table for a database of information about an auction;

DETAILED DESCRIPTION

Figure 1:
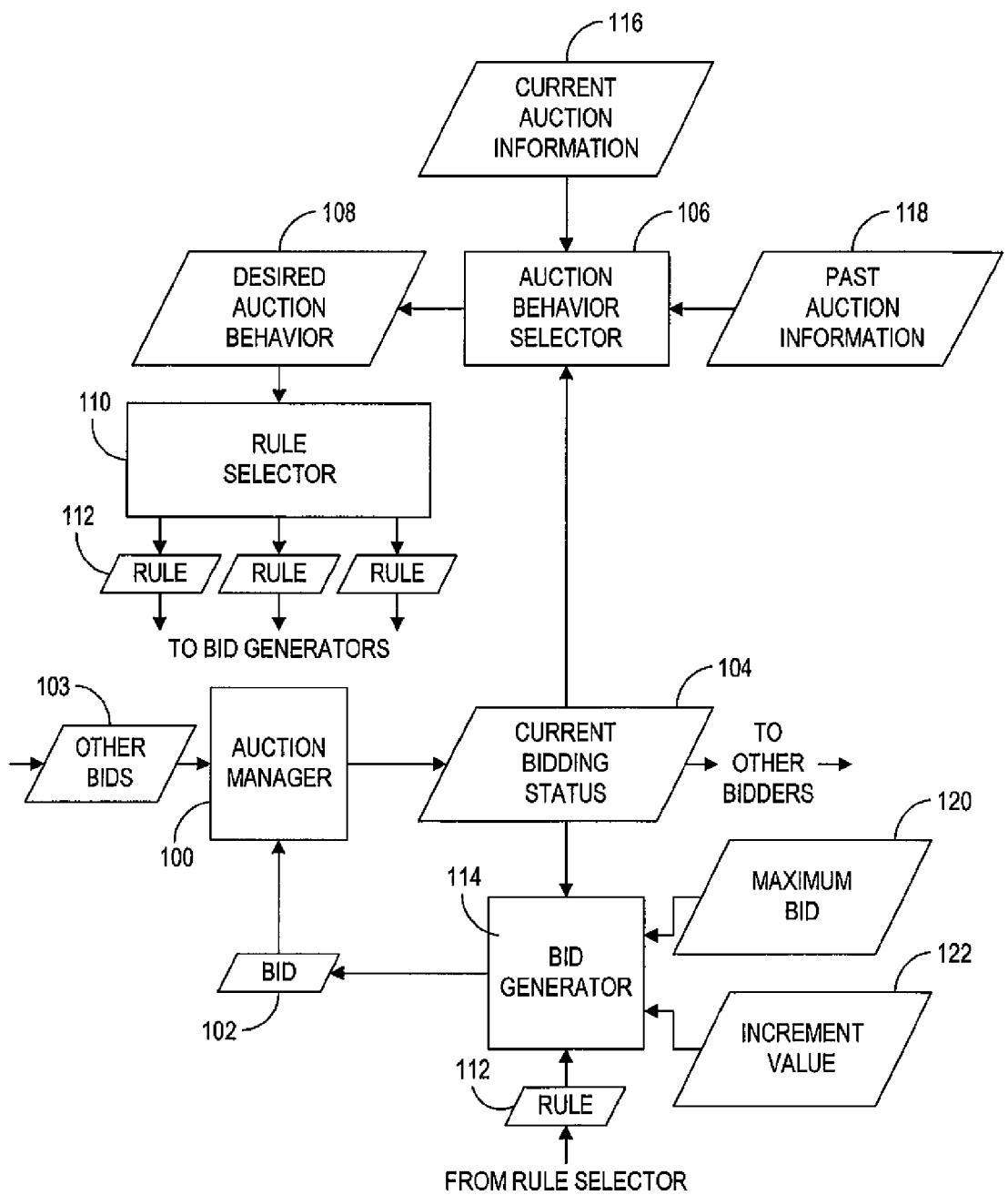
FIG. 1 is a dataflow diagram of an example online auction system.
Figure 2:
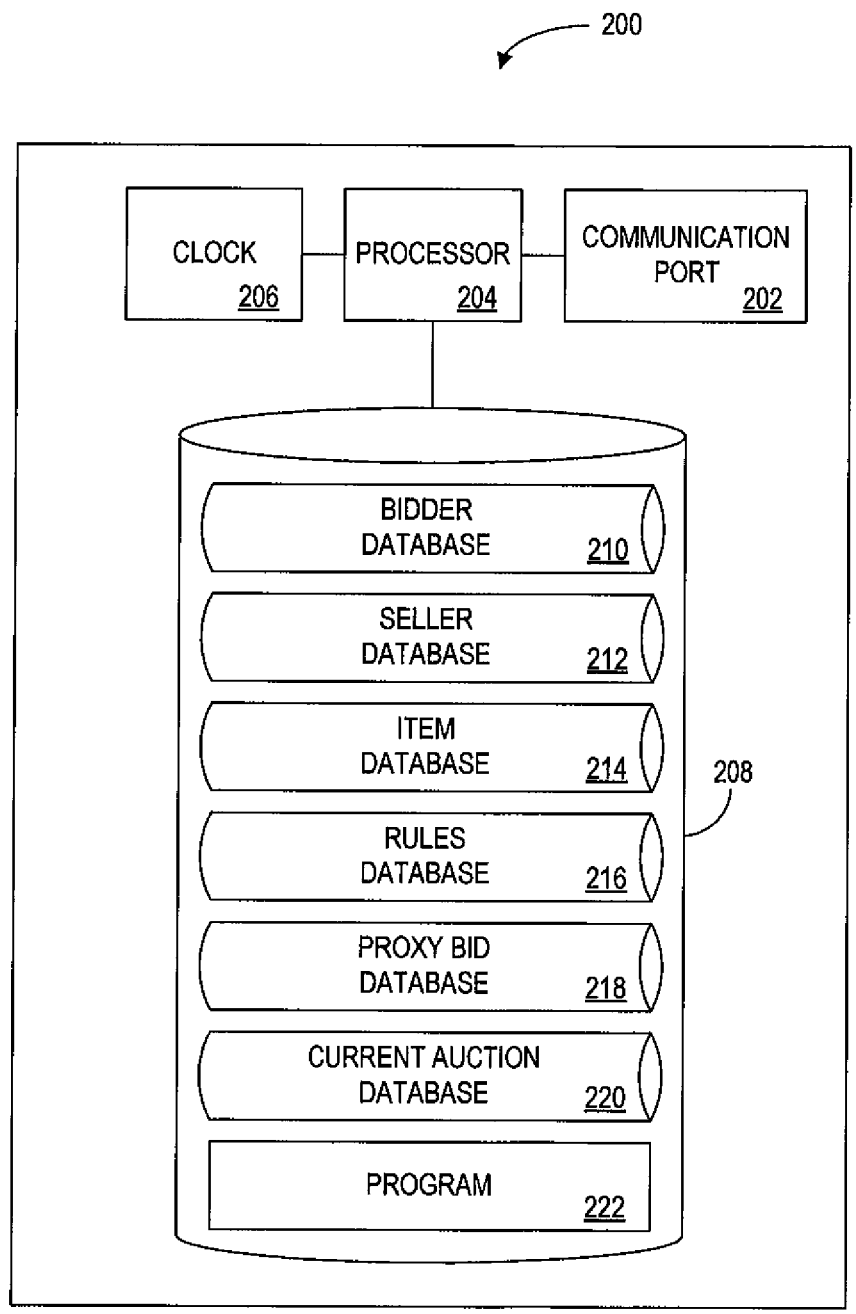
FIG. 2 is a diagram of an example auction server.

In one aspect of the present invention, a method for managing an auction involves specifying an auction behavior, and specifying at least one rule for controlling when a bid may be placed automatically for a bidder according to the specified auction behavior. At least one bid for a bidder may be placed automatically according to the at least one rule and according to at least one specified bidding behavior. If the highest bid in the auction is not from the bidder, the bid may be placed automatically according to the at least one specified bidding behavior at a time according to the at least one rule. The specified bidding behavior may be a maximum bid amount and a minimum bid increment. An auction behavior may be specified by determining the auction behavior according to information about the auction, which may include information about an item, information about a seller and for information about bidders.

The auction behavior may be determined by receiving information about one or more prior auctions, wherein each of the prior auctions has an associated auction behavior, and identifying at least one of the prior auctions as similar to the auction based on the information about the auction and the information about the one or more prior auctions. One or more of the prior auctions identified as similar to the auction then may be selected. The auction behavior associated with the selected one or more prior auctions may be as the auction behavior. At least one of the prior auctions similar to the auction may be identified by comparing information about the auction to the information about the one or more prior auctions using a metric to obtain a measure, and comparing the measure to a threshold defining an extent of similarity. The selected one or more prior auctions may be one which has a best outcome among the at least one of the prior auctions identified as similar to the auction. A best outcome may be a highest price or a fastest sale.

A rule may be specified by associating at least one rule with at least one candidate auction behavior from which the auction behavior is specified, and selecting the at least one rule associated with the specified auction behavior. At least one rule may be associated with each candidate auction behavior by determining at least one rule that corresponds to each candidate auction behavior; and storing the at least one rule in a database. A candidate auction behavior is a behavior of an auction similar to the current auction. At least one rule which corresponds to each candidate auction behavior may be determined by characterizing each candidate auction behavior, and selecting rules corresponding to the candidate auction behavior.

In one embodiment, actual auction behavior may be evaluated according to bids received in the auction. The at least one rule for controlling when a bid may be placed automatically in the auction may be modified according to the actual auction behavior. The actual auction behavior may be evaluated by characterizing the actual auction behavior according to bids received in the auction, and comparing the selected auction behavior to the actual auction behavior. The at least one rule may be modified by selecting at least one alternative rule corresponding to the actual auction behavior, for example, by selecting the at least one alternative rule randomly from among a plurality of rules.

In another aspect, a computer program product includes a computer readable medium with computer program instructions stored thereon, wherein the computer program instructions, when executed by a computer, direct the computer to perform the aforementioned method for managing an auction.

In another aspect, a system for managing an auction identifies an auction behavior, and identifies at least one rule for controlling when a bid may be placed automatically for a bidder in the auction according to the selected auction behavior.

In another aspect, a system for managing an auction includes an auction behavior selector and a rule generator. The auction behavior selector provides an indication of a selected auction behavior. The rule generator has an input for receiving an indication of the selected auction behavior and an output for providing at least one rule for controlling when a bid may be placed automatically for a bidder in the auction to encourage the selected auction behavior. The auction behavior selector may include a comparator and a selector. The comparator has an input for receiving the information about the at least one prior auction and information about the auction, and an output for providing an indication of at least one of the prior auctions similar to the auction. The selector has an input for receiving the indication of one or more of the prior auctions identified as similar to the auction and an output for providing an indication of the auction behavior associated with a selected one or more of the prior auctions.

In another aspect, a method for selecting an auction behavior for an auction, includes receiving information about the auction, and matching the information about the auction to an auction behavior. The information about the auction may be matched to the auction behavior by receiving information about one or more prior auctions, wherein each of the prior auctions has an associated auction behavior. At least one of the prior auctions is identified as similar to the auction using the information about the auction and the information about the one or more prior auctions. One or more of the prior auctions identified as similar to the auction is then selected. The auction behavior associated with the selected one or more prior auctions may be selected as the auction behavior. At least one of the prior auctions may be identified as similar to the auction by comparing information about the auction to the information about the one or more prior auctions using a metric to obtain a measure. This measure may be compared to a threshold defining an extent of similarity. The selected one or more prior auctions may be one that has a best outcome among the at least one of the prior auctions identified as similar to the auction, for example by having a highest price and a fastest sale.

In one embodiment, actual auction behavior may be evaluated according to bids received in the auction. The at least one rule for controlling when a bid may be placed automatically in the auction may be modified according to the actual auction behavior. The actual auction behavior may be evaluated by characterizing the actual auction behavior according to bids received in the auction, and comparing the selected auction behavior to the actual auction behavior. The at least one rule may be modified by selecting at least one alternative rule corresponding to the actual auction behavior, for example, by selecting the at least one alternative rule randomly from among a plurality of rules.

FIG. 1 illustrates an example online auction system for managing an auction. An auction is a public or private sale in which goods or services of a seller may be sold to a bidder through a bidding process. There are many kinds of auctions which differ in the manner in which bids are submitted and in the manner in which a bid is selected by the seller.

The online auction system in FIG. 1 includes an auction manager 100 which receives bids 102, 103 from one or more bidders participating in one or more auctions. A bid is an offer from or on behalf of a bidder, and the bid includes an offered price for the good or service being auctioned. The bid may specify an actual price or an amount relative to some other price, such as a predetermined value greater than a previous bid price. The bids may be received by the auction manager 100 in any of a number of ways, including, but not limited to, any data discernable by the auction manager as a bid, such as a message in any format of any computer communication protocol. To process a bid, the auction server uses an indication of the auction, the bidder and the bid price. A bid from a bidder may itself include any one or more of these pieces of information. Any information that the auction server can infer or derive need not be included in the bid itself. Thus, a bid generally includes an indication of one or more of the auction, the bidder and the bid price. The indication of the bidder may be any data indicative of an identifier, such as a name, address, telephone number, email address, security number, credit card number, or other data that can identify the bidder in the system. Automatically and manually generated bids may be received by the auction manager 100. Automatically generated bids may be received from one or more bid generators 114, also referred to herein as proxy bidders, described below.

The auction manager 100 maintains information about current bidding status 104 for each auction. The information about the current bidding status typically includes at least the highest bid price, and optionally an identifier of the highest bidder (the bidder that submitted the high bid, or on whose behalf the high bid was submitted). Information describing a bidding time and/or a type of bidder (e.g., whether manual or automatic) also may be included. Other information about the auction also may be provided, including, but not limited to, an identifier of the item, start and end dates and times of the auction, a number of bidders, and/or a minimum increment amount for a bid to exceed a previous bid. The current bidding status 104 is accessible by both manual and proxy bidders to enable bidders to make another bid. Manual and proxy bidders may access the current bidding status 104 by requesting information from the auction manager 100, or by reading the information from some storage location maintained by the auction manager, or by the auction manager sending the information to the bidder, or in any other manner appropriate given the implementation of the auction manager and/or proxy bidders.

Each bid generator 114 receives data specifying at least part of its bidding behavior. The bidding behavior indicates how the bid generator 114 generates a new bid from a current bid. The data specifying the bidding behavior may, in one embodiment, include a maximum bid price 120 and an increment value 122. The maximum bid price 120 indicates the maximum price which the bidder associated with the proxy bidder is willing to bid for an item. The increment value 122 is the amount by which the bid must exceed a previous bid. The increment value 122 may be defined for all bidders in the auction through the auction server, for example, by an individual or by the auction server itself. Alternatively, the bidder may specify his own increment value to be used by the corresponding bid generator. Any suitable interface, such as an HTML form, may be used to permit a bidder to specify the bidding behavior of the proxy bidder. Using the current bidding status 104, the bid generator generates the bid 102 according to the specified bidding behavior. In general, the bid generator adds the increment value 122 to the bid price of the previous bid to yield the bid price of the new bid. The bid price of the new bid may not exceed the maximum bid 120. If the highest bid price received during the auction exceeds the maximum bid price 120, then no bid is placed and/or the actual bidder is notified in some manner (e.g., using electronic mail) that his maximum bid price has been exceeded.

One or more rules 112 may be applied to determine, for example, when the bid is to be placed. Accordingly, the bid is not necessarily placed immediately after the bid generator 114 detects that a previously submitted bid price has been exceeded by another bidder. A rule applied by the bid generator 114 may be obtained from many sources. A rule may be specified by the bidder, by the auction system, by the seller, or any combination thereof. A rule may be created or may be selected from a predetermined list.

A rule specifies at least one condition (also called an "antecedent" or "predicate") and at least one consequent, which may include an action to be performed. A rule also may have an activator (also called a trigger or event), which causes the bid generator 114 to apply the rule. A rule is applied by determining whether its condition is true. If the condition is determined to be true, the consequent occurs, e.g., the specified action is performed. Typically, the action performed is placing a bid having a bid price that is higher than the current high bid price by a specified increment.

A condition may be specified as, for example, an amount of time that has passed and/or a number of bids that have been submitted. Additionally or alternatively, a condition may be specified using other information about the auction, such as the current price. A trigger similarly may be specified as, for example, an amount of time that has passed and/or a number of bids that have been submitted, or by some other event in the auction, such as an auction server indicating to the proxy bidder that it will accept a bid from the proxy bidder.

Both conditions and triggers may be specified using similar information; however, a condition is evaluated by a proxy bidder, whereas a trigger causes the proxy bidder to apply a rule. The specification of conditions and triggers to define a bidding behavior depends on implementation of the proxy bidder and coordination of information exchange between the auction server and the proxy bidder. Unless otherwise specified herein, therefore, the term condition encompasses triggers, except for triggers that specify only that the most recent bid from the proxy bidder is exceeded by a bid from another bidder or that are only a result of coordination by the auction server of acceptance of bids from proxy bidders.

As noted above, a condition generally may be specified using information about the auction or time or other information to determine when a bid may be placed by the proxy bidder. For example, a condition may be specified by a fixed amount of time or a variable amount of time. The variable amount of time may be a function of, for example but not limited to, the amount of time left in the auction, whether the auction has been extended, the rate at which bids are placed in the auction, or the current price of the item. A condition also may be specified by a fixed number of bids, e.g., one, or a variable number of bids. The variable number of bids may be a function of, for example, the amount of time left in the auction, whether the auction has been extended, the rate at which bids are placed in the auction, or the current high bid price for the item. A condition also may be specified by a ratio between a number of bids and an amount of time, which may be fixed or variable. Conditions also may be specified using any other information about the auction, such as who placed the last bid, number of bidders in the auction, etc.

Some example rules include, but are not limited to, placing a bid:

1. periodically at a predetermined time after a previous bid is placed, e.g., five minutes after a previous bid is placed;
2. periodically at a predetermined time after the auction has begun, e.g., every five minutes starting from one hour after the beginning of the auction;
3. according to a frequency of a predetermined number of previous bids, e.g., if the past five bids have occurred within twenty minutes, the proxy bid is placed within five minutes of the last bid; if the past five bids have occurred within one hour, the proxy bid is placed within fifteen minutes of the last bid;
4. after waiting a random amount of time after a previous bid is placed;
5. according to a bid price achieved by the last bid, e.g., if the high bid price exceeds a predetermined amount, the bid is placed more (or less) quickly;
6. according to an amount of time left in the auction, e.g., the bid is placed more (or less) quickly near the end of the auction;
7. at a predetermined time before the end of auction;
8. more or less quickly if the auction is going to be extended;
9. after a minimum number of bids is placed previously, e.g., the bid is placed after three other bids have been placed.

Many kinds of rules can be provided, and the invention is not limited to any particular rules. Rules also may be related to bidding by manual bidders. For example, the speed at which manual bids are placed may determine how the proxy bids are placed. Rules also may be specified at the beginning of an auction, but their application may be delayed until a specified action has occurred. One or more rules also may be specified for one or more proxy bidders to facilitate a desired auction behavior. An auction behavior is a manner in which bids in an auction are placed, for example, the times at which they are placed, the frequency with which they are placed, and the amount by which they exceed any previous bid. Generally, a desired auction behavior is an auction behavior that has a likelihood to provide the best beneficial outcome. The desired auction behavior is selected, by the seller, by an auctioneer or automatically, so as to improve or optimize the outcome of the auction, such as price at which and/or speed with which the item is sold, or other beneficial outcome for a party, whether seller, bidder or auctioneer.

An auction behavior selector 106 may be used to select a desired auction behavior 108. For example, the auction behavior selector may use one or more of the current bidding status 104, current information about the current auction 116, and/or information about past auctions 118. For example, the auction behavior selector may identify a prior auction that is most similar to the current auction, and select the auction behavior of that prior auction as the desired auction behavior. Similarity may be determined by comparing one or more values associated with the auctions, using any suitable similarity or distance metric to obtain a measure of similarity. A measure computed using a similarity metric generally increases with increased similarity of the compared items. A measure computed using a distance metric generally decreases with increased similarity of the compared items. Many kinds of metrics may be used, including Hamming distance, correlation, Euclidean distance and other metrics. The invention is not limited by any particular similarity or distance metric. One or more thresholds may be defined to which this measure may be compared to indicate an extent of similarity. An example implementation of an auction behavior selector 106 is described in more detail below.

Given a desired auction behavior, a rule selector 110 may select one or more rules 112, one or more of which may be applied to one or more proxy bidders in the manner described above. In general, the rule generator may associate one or more rules with each auction behavior, and provide an indication of such rules, given the desired auction behavior.

An example implementation of an online auction system will now be described in connection with FIGS. 2-9.

The auction behavior selector 106, auction manager 100, rule generator 110 and one or more bid generators 114 all may be present and operating on one or more computers or other devices acting as a server computer for the auction. This server computer, herein called an auction server, may be accessed by one or more computers or other devices used by sellers, and one or more computers or other devices used by bidders in any manner known in the art (e.g., via the Internet).

The auction server 200 may include one or more communication ports 202, one or more processors 204, an internal data and time clock 206, and storage 208 which includes one or more computer programs 222 defining instructions, which when executed, instruct the computer to perform the operations of the auction behavior selector, rule generator, auction manager and bid generator. The storage also may include a bidder database 210, seller database 212, item database 214, rules database 216, proxy bid database 218 and auction database 220. These programs and these databases will now be described in more detail in connection with FIGS. 3-8.

Figure 3:
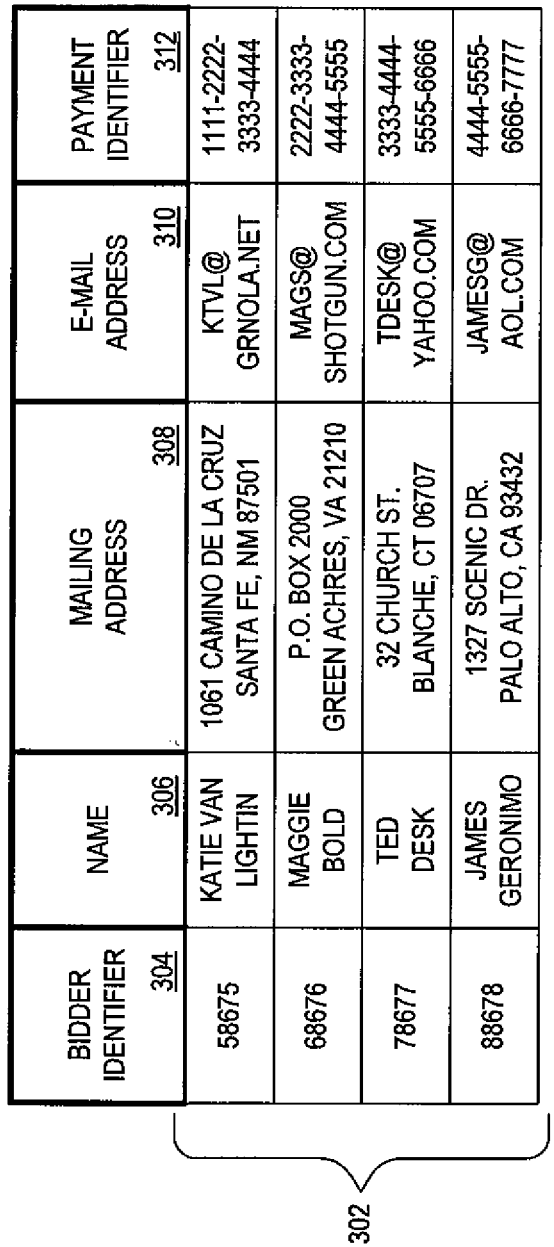
FIG. 3 is a diagram of an example table for a database of bidders.

FIG. 3 illustrates an example table 300 for a bidder database, which includes one or more records 302. In general, each record associates a bidder identifier 304 with a payment identifier 312 and optionally, additional information about the identified bidder. In this example, each record 302 includes a bidder identifier 304, name 306, mailing address 308, email address 310 and payment identifier 312. Entries in this database are made as users register with the auction server as described below. After a bidder registers for an auction for an item, a list corresponding items identifiers also may be stored in this entry for a bidder.

Figure 4:
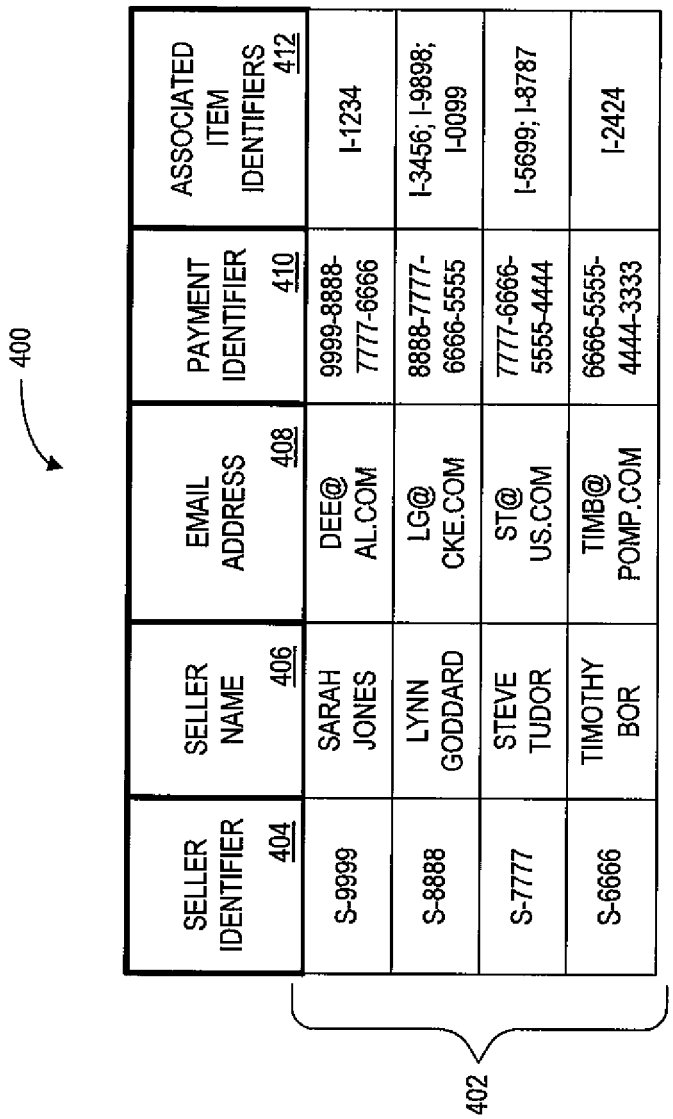
FIG. 4 is a diagram of an example table for a database of sellers.

FIG. 4 illustrates an example table 400 for a seller database, which includes one or more records 402. In general, each record associates a seller identifier 404 with one or more associated item identifiers 412 and optionally, additional information about the seller. Example additional information about the seller includes a name 406, an email address 408, and a payment identifier 410. Entries in this database are made and updated as sellers register items to be auctioned, as described below.

FIG. 5 illustrates an example table 500 for an item database, which includes one or more records 502, with one record for each item being auctioned. In general, each record associates an item identifier 504 with an item description 506 and optionally additional information such as an item category 508. The item description may be a textual description, list of features or any other information that serves to describe the item and/or enable a comparison of the item to other items. A selling price 510 also may be stored. Each item may have an associated behavior identifier 512, which indicates the auction behavior used for the auction of that item. A list of registered bidders also may be stored. Entries in this database are made and updated as sellers register items for auction, when a behavior is assigned to an auction and when an auction ends.

FIG. 6 illustrates an example table 600 for a rule database, which includes one or more records 602. This rule database may be used by the rule selector 110 of FIG. 1. Each record 602 in the rule database relates a behavior identifier 604 with a rule identifier 606. Each behavior also may have an associated description 608 that provides a prose description of the behavior. Similarly, each rule may have an associated description 610 that provides a prose description of the rule. Although the example table 600 illustrates one specific rule associated with each behavior, each behavior may be associated with one or more rules. The one or more rules may be specific or may include variables that are assigned different values for different proxy bidders. How behaviors may be associated with rules is described in more detail below.

FIG. 7 illustrates an example table 700 for a proxy bidder database that stores information about proxy bidders. This table includes one or more records 702, wherein each record includes a bidder identifier 704 and an item identifier 706 or other identifier of the auction. A proxy bidder also may have an associated rule identifier 708, which refers to a record in the rule database, and a bid ceiling, or maximum bid 710. This information enables the auction server to control the operation of all proxy bidders at a central location.

FIG. 8 illustrates an example record 800 from an auction database. This database stores information about present and past auctions. In the example shown in FIG. 8, a record 800 may include an item identifier 802, an auction start date and time 804, an auction end date and time 806, a current number of participating bidders 808 and a bid increment amount 810. The number of bidders may be inferred from a list of bidders associated with this item stored in either field 808 of this table 800 or in the item database. A list 812 includes one or more entries 814, wherein each entry associates a bidder 816 with a bid amount 818, a bidding time 820 and a type 822 of the bidder.

Each database may be any kind of database, including a relational database, object-oriented database, unstructured database or other database. Example relational databases include Oracle 8i from Oracle® Corporation of Redwood City, Calif., Informix Dynamic Server from Informix Software, Inc. of Menlo Park, Calif., DB2 from International Business Machines of Yorktown Heights, N.Y., and Access from Microsoft® Corporation of Redmond, Wash. An example object-oriented database is ObjectStore from Object Design of Burlington, Mass. An example unstructured database is Notes from the Lotus® Corporation, of Cambridge, Mass. A database also may be constructed using a flat file system, for example by using files with character-delimited fields, such as in early versions of dBASE, now known as Visual dBASE from Inprise™ Corp. of Scotts Valley, Calif., formerly Borland International Corp. Notwithstanding these possible implementations of the foregoing databases, the term database as used herein refers to any data that is collected and stored in any manner accessible by a computer.

Figure 9:
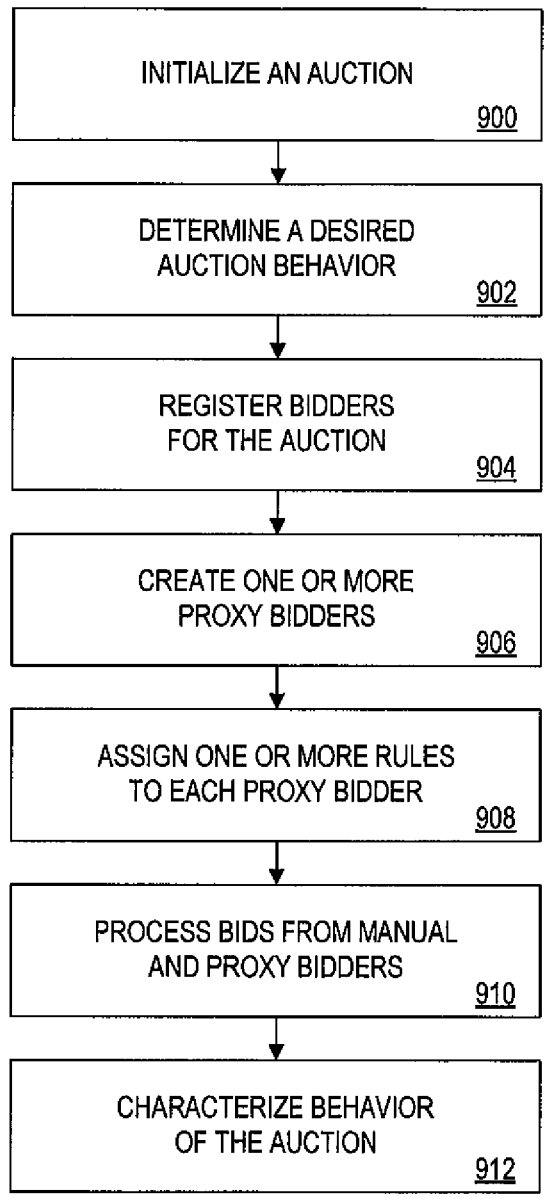
FIG. 9 is a flowchart describing how an auction is performed in one embodiment.

Having now described the databases maintained by the auction server in this embodiment, the various operations performed by the auction server will now be described. Referring to FIG. 9, these operations include, but are not limited to, initializing (900) an auction by receiving information from a seller about the seller and the item to be offered for sale, determining (902) a desired auction behavior for an auction, registering (904) bidders for an auction, creating (906) a proxy bidder for a registered bidder, assigning (908) bidding rules to proxy bidders, and processing (910) bids received from bidders. Optionally, the behavior of the auction also may be characterized (912). During the auction, the actual auction behavior and the desired auction behavior are different, the rules may be updated to effect the desired auction behavior. The various operations in FIG. 9 need not be performed sequentially or in the order shown. These various operations will now be described in more detail.

Figure 10:
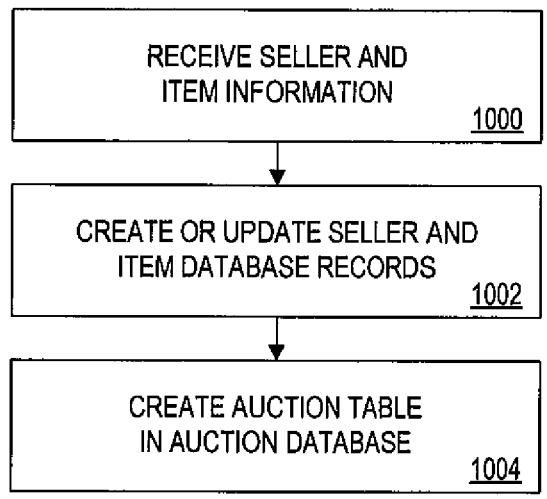
FIG. 10 is a flowchart describing how an auction may be initialized.

Referring to FIG. 10, to initialize an auction, information about the seller and the item to be auctioned is received (1000) from the seller by the auction server. Information about the seller, in an embodiment using the database structure described above, may include a seller name, email address, and payment identifier. Information about the item may include a description of the item and a category. Any conventional registration process and mechanism may be used to obtain this information from a seller. The seller information and the item information may be provided separately and at different times, enabling the seller to register once, but offer multiple items for auction at different times.

Records in the seller information database of FIG. 4 and the item information database of FIG. 5 are created or updated (1002) using the received information. In particular, the auction server associates a seller identifier with the seller information and an item identifier with the item. A record for the seller is created in the seller database and for the item in the item database, "linked" by the item identifier. The selling price (510 in FIG. 5) for the item is set to an arbitrary initial value.

A table 800 (FIG. 8) for the auction is then created (1004), which is associated to the item database through the item identifier (802 in FIG. 8). The auction start time 804 and end time 806 may be specified by the seller or the auction server. The current number of participating bidders 808 is initially set to zero. The bid increment amount may be set by the auction server, by a third party through the auction server, or by the seller. An initial bid amount also may be provided and stored in an entry 814 in the list 812.

Figure 11:
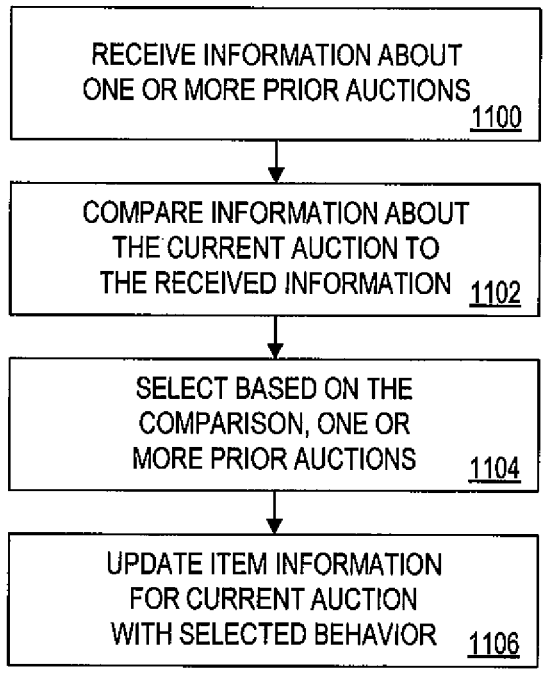
FIG. 11 is a flowchart describing how a desired auction behavior may be determined.

Referring to FIG. 11, after initializing the auction, a desired auction behavior may be determined for the auction. The selection of a desired auction behavior, from which the rules for proxy bidders may be generated, generally is performed by receiving information about the auction and matching this information about the auction to a behavior that is likely to provide the best beneficial outcome. This matching may be performed in many ways. For example, matching the auction to a behavior may involve receiving (1100) information about one or more prior auctions, wherein each prior auction has an associated auction behavior. At least one of the prior auctions is identified as similar to the current auction. For example, the information about the auction, such as the item description, item category, seller information and/or information in the auction database (FIG. 8), may be compared (1102) to the information about the one or more prior auctions. One or more of the prior auctions identified as similar to the current auction is then selected (1104). Typically, the prior auction that is selected is the auction that has the best beneficial outcome among the prior auctions identified as similar to the current auction. For example, the auction that is selected may be the auction with the highest price, or fastest sale, or other beneficial outcome. Because the selected prior auction is associated with an auction behavior, for example, through the database of FIG. 5, the auction behavior of that selected prior auction now may be used for the current auction. An identifier and description of the identified behavior is stored (1106) in the database shown in FIG. 5.

Figure 12:
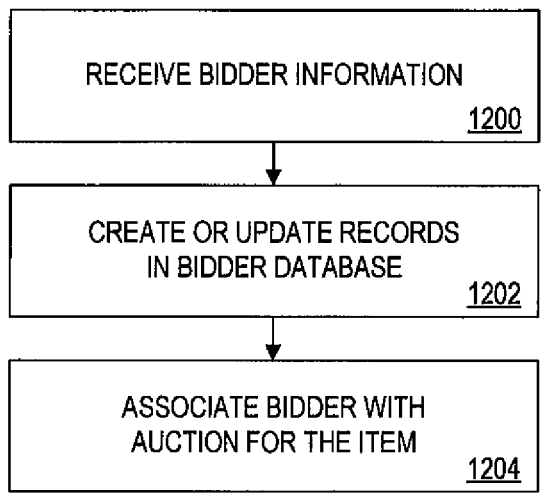
FIG. 12 is a flowchart describing how bidders may be registered for an auction.

Referring to FIG. 12, after initializing the auction, bidders may register to participate in the auction. Bidders may register prior to a desired auction behavior being selected for the auction. Information about the bidder is received (1200) by the auction server. Information about the bidder, in an embodiment using the database structure described above, may include a name, mailing address, email address, and/or payment identifier. Any conventional registration process and mechanism may be used to obtain this information from a bidder.

Records in the bidder database of FIG. 3 are created or updated (1202) using the received information. In particular, the auction server associates a bidder identifier with the bidder information, and a record for the bidder is created in the bidder database. Entries in a bidder database, such as is shown in FIG. 3, may be created and updated separately for each auction. Bidders also may register with the auction server separately from registering to participate in an auction. In this embodiment, records may be created and updated in the bidder database independently of the auctions. The bidder's information is associated (1204) with the auction in any of the ways described above.

Figure 13:
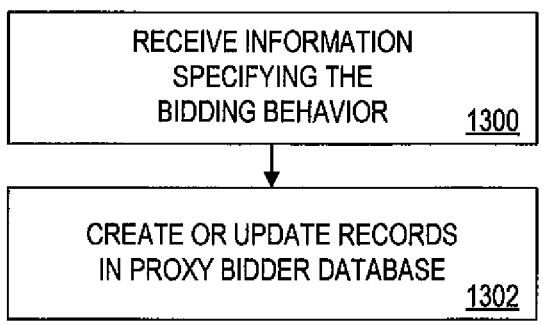
FIG. 13 is a flowchart describing how one or more proxy bidders may be created.

Referring to FIG. 13, at any time before or during the auction, and after the selection of the desired auction behavior, a registered bidder may create and/or modify a proxy bidder. Information specifying the bidding behavior of the proxy bidder is received (1300) from the bidder by the auction server. Such information, in an embodiment using the database structure described above, may include a maximum bid and an indication of the item or auction for which the proxy bidder is to be used. The identity of the bidder may be determined through any conventional authentication process or mechanism, possibly using the bidder database of FIG. 3. A corresponding record is then created or updated (1302) by the auction server in a proxy bidder database, such as shown in FIG. 7.

Figure 14:
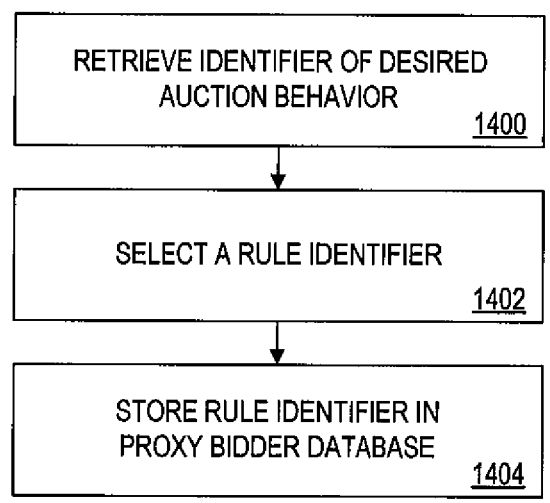
FIG. 14 is a flowchart describing how one or more rules may be assigned to each proxy bidder.

Referring to FIG. 14, when a proxy bidder is created, the auction server also associates one or more rules with the proxy bidder to effect the desired auction behavior. These rules may be assigned statically or dynamically to the proxy bidder. In an embodiment using the database structure described above, using the item identifier, the selected desired auction behavior for the auction is retrieved (1400) from the item database (FIG. 5).

A rule identifier associated with the desired auction behavior is selected (1402) from the rule database in FIG. 6. In general, the assignment of the bidding rules to proxy bidders is coordinated so that the desired auction behavior is achieved. A rule may be selected sequentially or randomly for each proxy bidder from the rules associated with the desired auction behavior. The one or more rules may be specified such that the condition includes a variable that is assigned differently for each proxy bidder. The variable may have a range of candidate values, from which a particular value for a rule for a proxy bidder is selected. The rule generator may take various other information into account to assign rules. For example, the bid ceiling of each bidder, the length of the auction and the number of bidders may be used to select a rule. An implementation for creating the rule database of FIG. 6 is described in more detail below in connection with FIG. 17. The selected rule identifier is stored (1404) in the proxy bidder database (708), associated with the identifier of the bidder who created the proxy bidder and the item identifier.

Figure 15:
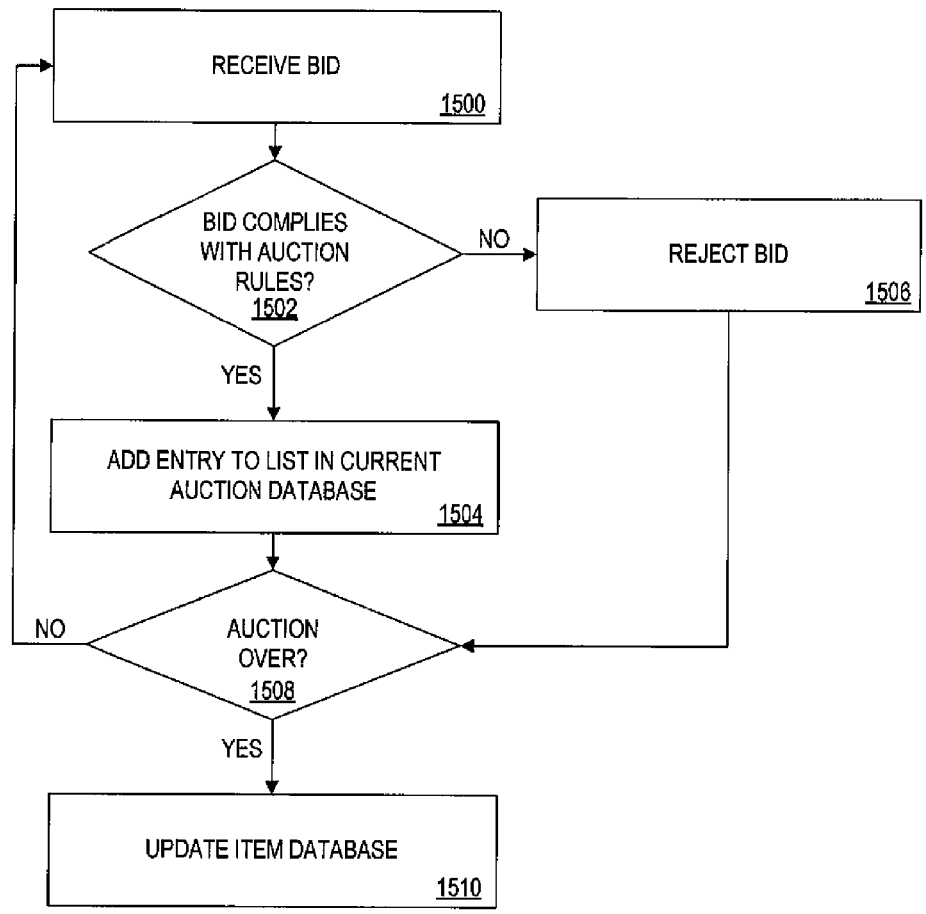
FIG. 15 is a flowchart describing how bids for manual and proxy bidders may be processed.

Referring to FIG. 15, after registration of a seller, an item, and bidders, and after initialization of the auction information, bidding in an auction may commence at or after the specified auction start time. During the auction, the auction server receives (1500) both manually and automatically generated bids. Conflicting bids may be processed in any appropriate manner, using any conventional process or mechanism. If proxy bidders are implemented by the auction server, coordination by the auction server of bids from proxy bidders with the receipt of bids from manual bidders may be performed using any conventional process or mechanism, as described below. For each bid that is received, if the bid complies with the auction rules, as determined at 1502, entry 814 corresponding to the bid is added (1504) to table 800 (FIG. 8), including the identifier of the bidder, the bid amount, the time at which the bid was placed and the type of bidder (whether manual or proxy). A bid that does not comply with the auction rules may be rejected (1506) by the auction server. After a bid is processed, if the auction is not over, as determined at 1508 by comparing the current time to the auction end date/time 808 (FIG. 8), more bids may be received (1500). Also, as noted above, any time during the auction, the behavior of the auction may be characterized (such as described below in connection with FIG. 16) and rules associated with the proxy bidders may be modified. If the auction is over, the selling price may be stored (1510) in the item database (510 in FIG. 5).

The operation of a proxy bidder may be initiated in many ways, and at many times. For example, each proxy bidder may be evaluated by the auction server after each bid is placed, or after each period of time has passed. The auction server may determine whether each proxy bidder could place a bid, for example, by determining whether any prior bid was exceeded and whether the maximum bid was exceeded. If the proxy bidder could place a bid, its associated rule is applied. If the conditions of the rule are satisfied, then a new bid is submitted for the proxy bidder to the auction manager. A bid from each proxy bidder may be computed and submitted, e.g., in sequence, in parallel, in a round-robin manner or in any other manner desirable.

Alternatively, a proxy bidder may be separate program, for example executed on a client machine, or may be one or more separate threads of a program executed by the auction server, or may be an autonomous or semiautonomous agent. If proxy bidders are not centrally controlled, as in these embodiments, the database of data shown in FIG. 7 may be omitted. In this embodiment, a bid from a proxy bidder is handled by the auction server as if it were a manually submitted bid.

If proxy bidders are centrally controlled, proxy bidders may be delayed in submitting proxy bids for long enough to prompt the manual bidders to create proxy bidders near the end of an auction. This notification would enable manual bidders to continue participating in the auction and may help increase the purchase price of the item.

Figure 16:
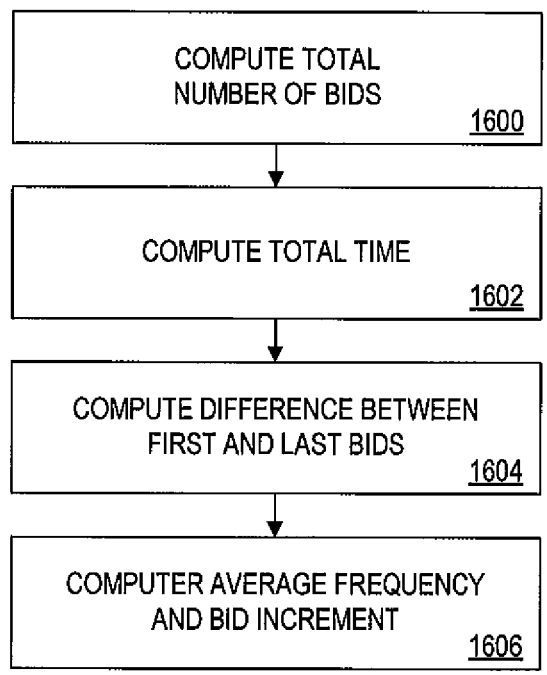
FIG. 16 is a flowchart describing how behavior of an auction may be characterized.

After a number of bids has been received in an auction, whether during or after the auction, the behavior of the auction may be characterized, as noted at 912 in FIG. 9. Referring to FIG. 16, how such a characterization of the behavior of an auction may be derived from data about the actual bidding information in the auction will now be described. For example, the auction behavior may be characterized using the frequency with which bids were placed, and amounts by which bids exceeded any previous bids in the auction. Various mathematical processes may be applied to the data to determine this and other information that may characterize the behavior of the auction. For example, in an embodiment using a database such as shown in FIG. 8, the total number of bids is computed (1600). The amount of time between the first bid and the last bid is computed (1602). The difference between the first bid and the last bid is computed (1604). From this information, an average frequency and increment may be determined.

Other historical data which may be used to characterize the behavior of an auction includes information about the bidders, such as the bidder's history with the auction server, including, but not limited to, how many items the bidder has bid for an item, how much money has been spent by the bidder and the auction behavior that enticed the bidder to bid aggressively or spend the most amount of money. The time of the year the auction was conducted also may be relevant. Auctions also may be compared to determine which behaviors are associated with the best outcomes among a set of similar auctions. In this manner, the auction server collects data about kinds of behaviors that produce the best outcomes in various auctions.

If the behavior of the current auction is characterized during the auction, the behavior of the current auction may be compared to the desired auction behavior to determine whether the desired auction behavior is being achieved. The rule assignments then may be changed dynamically during the auction depending on whether the desired auction behavior is being achieved. For example, if the desired auction behavior is to have bids occurring every five minutes, with and average increment of two dollars, and the actual behavior has bids occurring every two minutes, the proxy bidders rules may be changed so as to increase the average amount of time between proxy bids.

Figure 17:
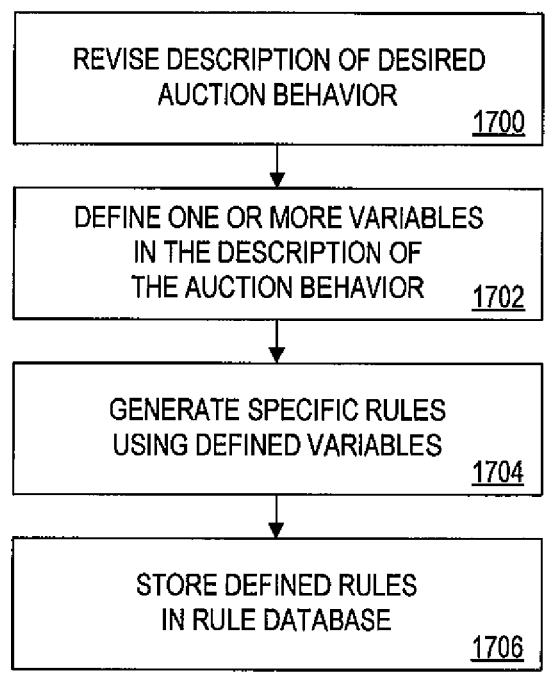
FIG. 17 is a flowchart describing how the rule database may be developed.

Referring now to FIG. 17, how a desired auction behavior is associated to rules, which are selected and assigned to the proxy bidders, will now be described. In particular, as noted above, one or more rules may be associated with an auction behavior, which is defined. A specification of the desired auction behavior is received (1700), for example, as an average bidding frequency and average bidding increment. The average bidding frequency and average bidding increment are used to define (1702) one or more variables. These variables may have a range of candidate values defined from actual auction behaviors. A single variable rule may be specified, with the range of candidate values, and stored in the rule database, from which specific rules may be derived as rules are assigned to proxy bidders. Alternatively, multiple specific rules may be specified (1704). The defined rules, whether general or specific, are stored in the rule database, associated with the desired auction behavior.

Figure 18:
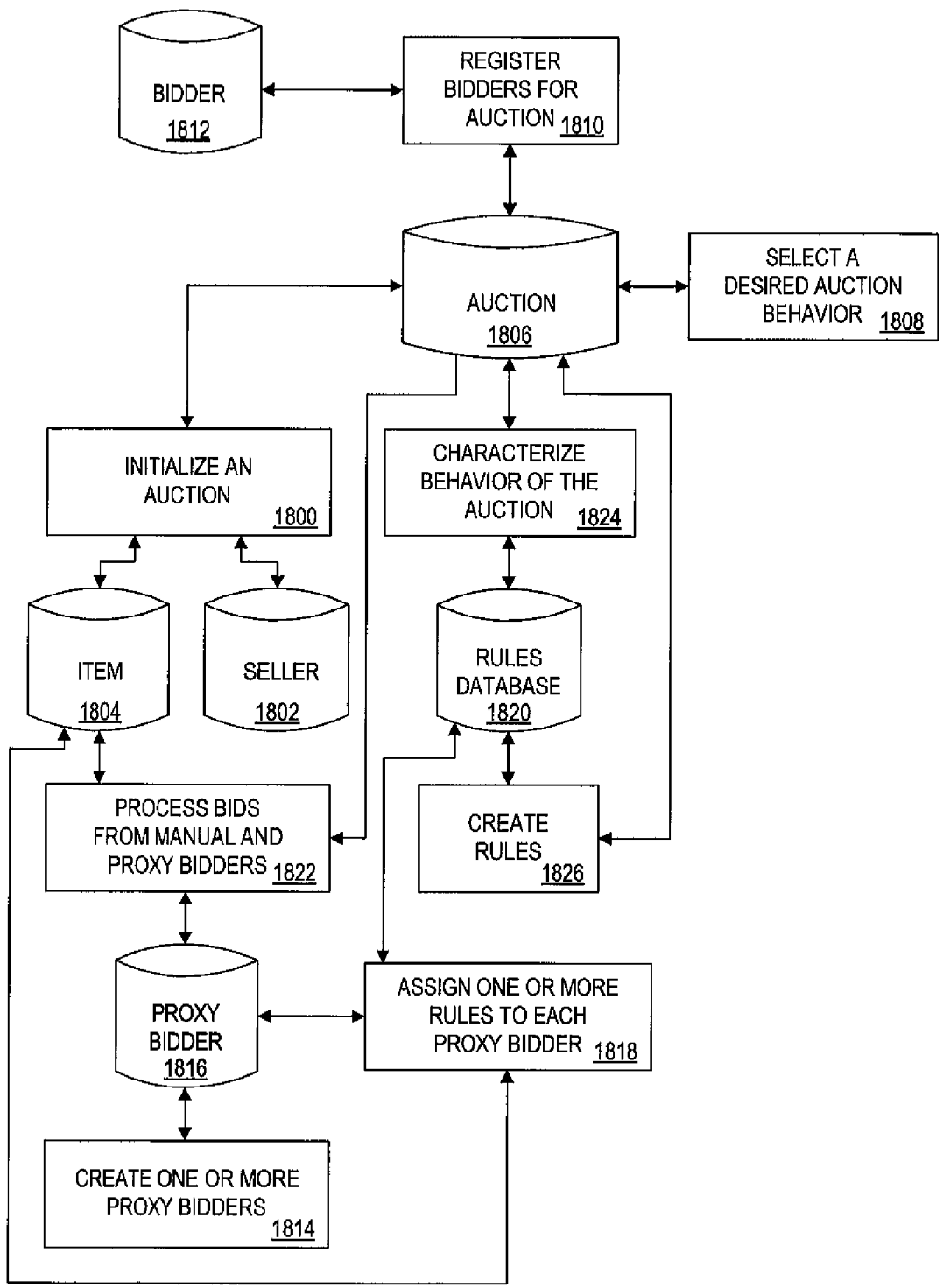
FIG. 18 is a block diagram illustrating a relationship between processes corresponding to the flowchart of FIG. 9 and the databases of FIGS. 2-8, in one embodiment.

Referring now to FIG. 18, a block diagram of the activities described in FIGS. 9-17 and how they interact with the databases of FIGS. 3-8 will now be described. As indicated at 1800, initialization of the auction uses the seller database 1802, item database 1804 and auction database 1806. Selection 1808 of a desired auction behavior uses at least the item database 1804 and the auction database 1806. Registration 1810 of the bidder uses the bidder database 1812, and optionally the item database 1804 or the auction database 1806 to associate the bidder with the auction. Creation or modification 1814 of a proxy bidder for a bidder uses the proxy bidder database 1816. The bidder database 1812 and item database 1804 may be used for verification purposes. Assignment 1818 of rules uses the item database 1804, rule database 1820 and the proxy bidder database 1816. Processing 1822 of bids uses the proxy bidder database 1816, item database 1804 and auction database 1806. Characterization 1824 of an auction uses the auction database 1806 and may use the rules database 1820. Creation 1826 of the rules database 1820 uses the auction database 1806, and other information as desired.

A computer system with which the various elements of the auction system of FIG. 1 and/or FIG. 18 may be implemented either individually or in combination typically includes at least one main unit connected to both an output device which displays information to a user and an input device which receives input from a user. The main unit may include a processor connected to a memory system via an interconnection mechanism. The input device and output device also are connected to the processor and memory system via the interconnection mechanism.

One or more output devices may be connected to the computer system. Example output devices include cathode ray tubes (CRT) display, liquid crystal displays (LCD) and other video output devices, printers, communication devices such as a modem, storage devices such as a disk or tape, and audio output. One or more input devices may be connected to the computer system. Example input devices include a keyboard, keypad, track ball, mouse, pen and tablet, communication device, and data input devices such as audio and video capture devices. The invention is not limited to the particular input or output devices used in combination with the computer system or to those described herein.

The computer system may be a general purpose computer system which is programmable using a computer programming language, such as C, C++, Java, or other language, such as a scripting language or even assembly language. The computer system may also be specially programmed, special purpose hardware, or an application specific integrated circuit (ASIC). The bidder's device also may be a pager, telephone, personal digital assistant or other electronic data communication device.

In a general purpose computer system, the processor is typically a commercially available processor, of which the series x86 and Pentium series processors, available from Intel, and similar devices from AMD and Cyrix, the 680×0 series microprocessors available from Motorola, the PowerPC microprocessor from IBM and the Alpha-series processors from the former Digital Equipment Corporation, and the MIPS microprocessor from MIPS Technologies are examples. Many other processors are available. Such a microprocessor executes a program called an operating system, of which WindowsNT, Windows 95 or 98, IRIX, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory, and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. The invention is not limited to a particular memory system.

Such a system may be implemented in software or hardware or firmware, or any combination thereof. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

The invention is not limited to a particular computer platform, particular processor, or particular high-level programming language. Additionally, the computer system may be a multiprocessor computer system or may include multiple computers connected over a computer network. Various possible configurations of computers in a network permit many users to participate in an auction, even if they are dispersed geographically.

Each module or step shown in the accompanying figures and the substeps or subparts shown in the remaining figures may correspond to separate modules of a computer program, or may be separate computer programs. Such modules may be operable on separate computers or other devices. The data produced by these components may be stored in a memory system or transmitted between computer systems or devices. The plurality of computers or devices may be interconnected by a communication network, such as a public switched telephone network or other circuit switched network, or a packet switched network such as an Internet protocol (IP) network. The network may be wired or wireless, and may be public or private.

Having now described a few embodiments, it should be apparent to those skilled in the art that the foregoing is merely illustrative and not limiting, having been presented by way of example only. Numerous modifications and other embodiments may be made. For example, rules may be applied in order to test their effect when placed at specific times during an auction. Rules to be applied to proxy bids also may be specified by the bidder of the item. Such capability may provide the bidder influence on how other bidders behave in the auction, and provide more feeling of control. A bidder may be required to pay for this service. In addition, when proxy bidders are bidding in the last moments of an auction against manual bidders, the auction server could delay submitting proxy bids for long enough to prompt the manual bidders to submit bid ceilings so that they have a chance of remaining in the auction. This notification would enable manual bidders to continue participating in the auction and may help the item be purchased for a higher price, thus benefiting the auctioneer and the seller of the item. The notification may be available only for an additional cost if desired.

What is claimed is:

1. A method, comprising:
    retrieving, by a computer, a stored indication of a desired sales behavior assigned to a specific sale;
    retrieving, by the computer and based on the desired sales behavior assigned to the specific sale, a stored indication of a plurality of proxy bidder rules;
    receiving, by the computer, an indication of a request for a first bidder to establish a first proxy bidder for the specific sale; and
    assigning, by the computer, a first one of the plurality of proxy bidder rules to the first proxy bidder.

2. The method of claim 1, further comprising:
    receiving, by the computer, an indication of a request for a second bidder to establish a second proxy bidder for the specific sale; and
    assigning, by the computer, a second one of the plurality of proxy bidder rules to the second proxy bidder.

3. The method of claim 1, wherein the first and second ones of the plurality of proxy bidder rules are assigned by coordinating proxy bidder rules to achieve the desired sales behavior assigned to the specific sale.

4. The method of claim 1, wherein the first one of the plurality of proxy bidder rules is assigned based on a sequential selection sequence from the plurality of proxy bidder rules.

5. The method of claim 1, wherein the first one of the plurality of proxy bidder rules is assigned based on a random selection sequence from the plurality of proxy bidder rules.

6. The method of claim 1, further comprising:
    initiating, by the computer and after the assigning first one of the plurality of proxy bidder rules to the first proxy bidder, the specific sale;
    comparing, by the computer, an actual behavior of the specific sale to the desired sales behavior assigned to the specific sale to determine whether the desired sales behavior is being achieved; and
    replacing, by the computer and in the case that the desired sales behavior is not being achieved, the first one of the plurality of proxy bidder rules assigned to the first proxy bidder with a different one of the plurality of proxy bidder rules.

7. The method of claim 1, wherein the computer comprises an auction server.

8. A non-transitory computer-readable medium storing instructions that when executed by a processor result in:
    retrieving a stored indication of a desired sales behavior assigned to a specific auction-style sale,
    retrieving, based on the desired sales behavior assigned to the specific auction-style sale, a stored indication of a plurality of proxy bidder rules;
    receiving an indication of a request for a first bidder to establish a first proxy bidder for the specific auction-style sale; and
    assigning a first one of the plurality of proxy bidder rules to the first proxy bidder.

9. An apparatus, comprising:
    a processor; and
    a memory device in communication with the processor, the memory device storing instructions that when executed by the processor result in:
        retrieving a stored indication of a desired sales behavior assigned to a specific sale;
        retrieving, based on the desired sales behavior assigned to the specific sale, a stored indication of a plurality of proxy bidder rules;
        receiving an indication of a request for a first bidder to establish a first proxy bidder for the specific sale; and
        assigning a first one of the plurality of proxy bidder rules to the first proxy bidder.

* * * * *